United States Patent [19]

Dornhoff

[11] Patent Number: 5,041,062
[45] Date of Patent: Aug. 20, 1991

[54] MULTIPLE DRIVE POWER TAKE OFF

[76] Inventor: Kenneth Dornhoff, HC-69, Box 169, Heartwell, Nebr. 68945

[21] Appl. No.: 484,924

[22] Filed: Feb. 26, 1990

[51] Int. Cl.⁵ .......................... F16H 7/00; F16H 57/05
[52] U.S. Cl. ..................................... 474/144; 184/15.1
[58] Field of Search ................................ 474/144–147, 474/91; 184/15.1; 74/665 GE

[56] References Cited

U.S. PATENT DOCUMENTS

| | | | |
|---|---|---|---|
| 1,788,992 | 1/1931 | Ecabert | 184/15.1 X |
| 1,960,693 | 5/1934 | Bryant | 184/15.1 |
| 3,463,267 | 8/1969 | Dooley et al. | 184/15.1 X |
| 3,610,055 | 4/1970 | Parris | 474/146 X |
| 3,885,471 | 5/1975 | Morine et al. | 474/144 |

Primary Examiner—Thuy M. Bui
Attorney, Agent, or Firm—Zarley, McKee, Thomte, Voorhees & Sease

[57] ABSTRACT

A single output drive shaft of a tractor is converted to multiple output drive shafts. A housing is firmly mounted to the tractor and a drive shaft extends through the housing and is connected at its forward end to the tractor while the rear output end is connected to a tool mounted to the housing by a bracket similar to that mounting the housing to the tractor. A sprocket chain running through oil in the housing is connected to additional output drive shafts. The output drive shafts are generally arranged in a triangular configuration and the housing has a generally similar shape.

16 Claims, 2 Drawing Sheets

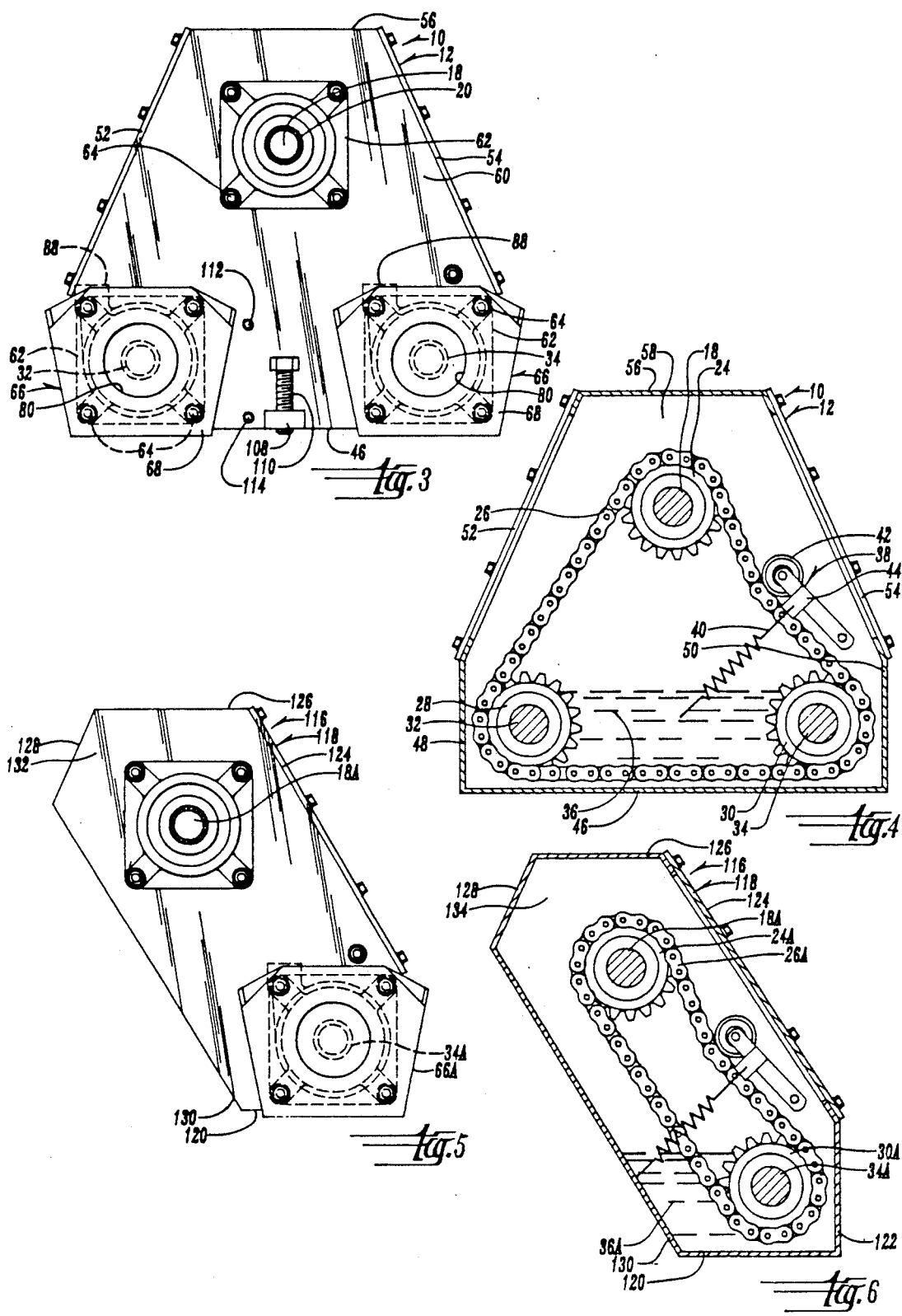

MULTIPLE DRIVE POWER TAKE OFF

BACKGROUND OF THE INVENTION

A tractor is equipped with one power take off shaft which would ordinarily drive one piece of equipment such as the hydraulics for an air planter. Substantial increased efficiencies would result if a multiple drive power take off were available for powering other equipment such as a fertilizer spreader and a herbicide applicator.

SUMMARY OF THE INVENTION

A multiple power take off is provided which has a housing with a forwardly extending input drive shaft adapted to be connected to the tractor power take off drive shaft by a chain coupler positioned in a mounting bracket connecting the housing to the tractor. The input drive shaft is connected to a sprocket in the housing which in turn has an output drive shaft portion extending rearwardly of the housing and is adapted to be connected to a tool such as an air planter secured to a similar shaped mounting bracket as connects the housing to the tractor. A chain in the housing extends around additional sprockets on second and third output drive shafts which are also adapted to be connected to other tools such as a fertilizer spreader and a herbicide applicator. A mounting bracket similar to that which mounts the housing to the tractor ma also be used for mounting the fertilizer spreader and herbicide applicator to the housing.

The housing contains a reservoir of oil in which two of the output drive shafts are positioned thereby lubricating the entire drive chain assembly in the housing. The output drive shafts are positioned in a triangular arrangement. The housing includes a bottom wall with upstanding side walls which merge into upwardly and inwardly extending walls which in turn merge into a top wall thereby presenting a streamline and compact housing size to fit on most tractors without interference with other equipment carried on the tractor.

DESCRIPTION OF THE DRAWINGS

FIG. 3 is a rear elevational view thereof.

FIG. 4 is a cross sectional view taken along line 4—4 in FIG. 2.

FIG. 5 is a rear elevational view of a modified multiple drive power take off providing two output drive shafts.

FIG. 6 is a cross sectional view of the multiple drive power take off of FIG. 5 similar to that of FIG. 4.

DESCRIPTION OF THE PREFERRED EMBODIMENT

Figure 1:
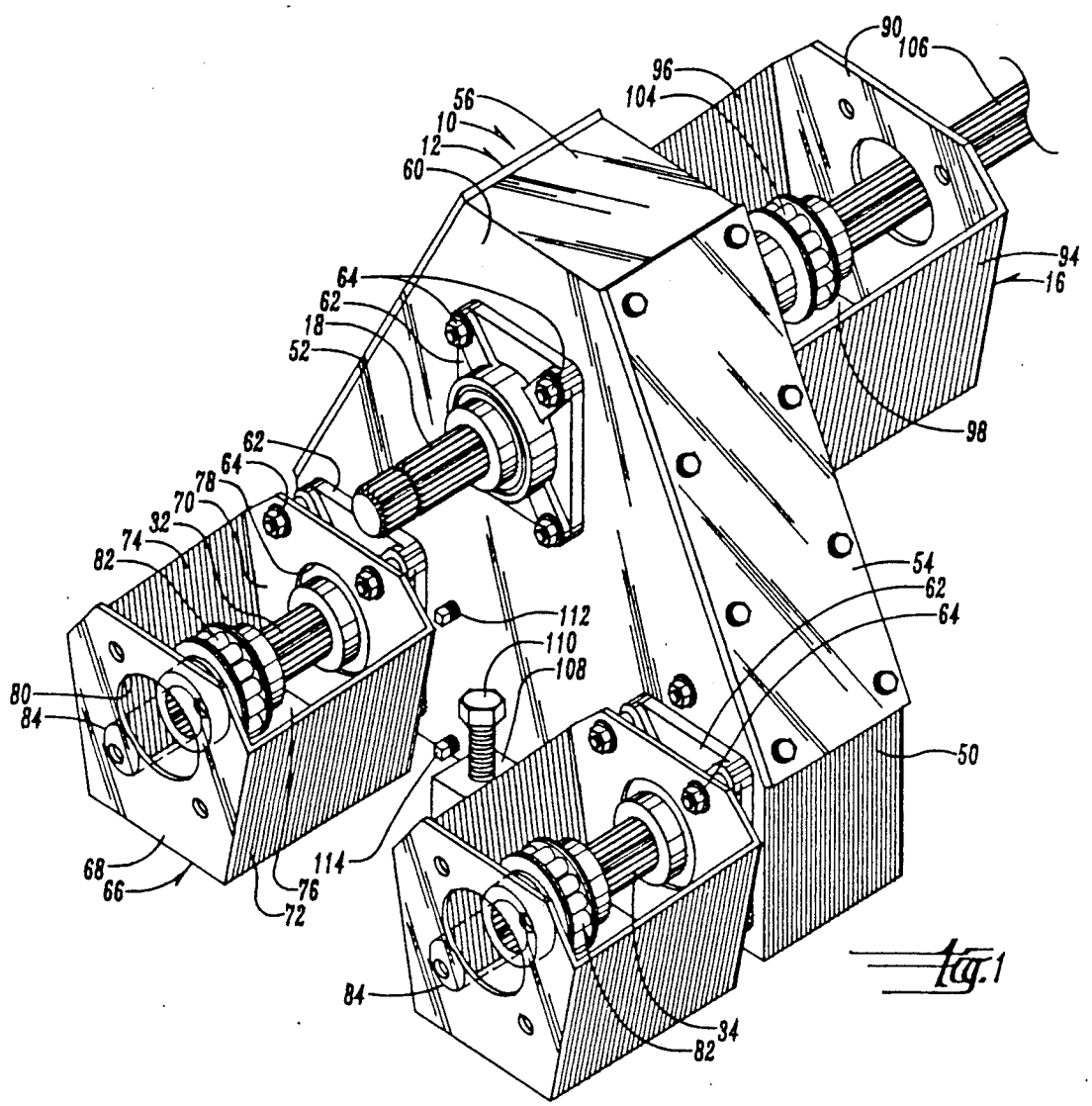
FIG. 1 is a perspective view of the multiple drive power take off including a tractor mounting bracket on the front side and tool mounting brackets on the rear side.

The multiple drive power take off of this invention is referred to generally in FIG. 1 by the reference numeral 10 and includes a housing 12 which is mounted on a tractor 14 through a bracket 16.

A drive shaft 18 extends through the housing 12 providing a rearwardly extending output drive shaft portion 20 and a forwardly extending input drive shaft 22 with a drive gear sprocket 24 being mounted thereon inside the housing as seen in FIG. 4. A drive sprocket chain 26 extends around the sprocket 24 and around sprockets 28 and 30 mounted on output drive shafts 32 and 34 respectively. The sprockets 28 and 30 are located in a reservoir 36 of oil in the housing 12 thereby keeping all parts in the drive system lubricated. A chain tightener 38 is pivotally mounted in the housing and is spring biased into engagement with the chain 26 by a spring 40. A pulley 42 is carried on a chain tightener arm 44 and engages the chain 26.

It is seen that the output drive shafts 20, 32 and 34 are arranged in a triangular configuration and the housing 12 is similarly shaped. Specifically the housing 12 includes a bottom wall 46 with upstanding vertical side walls 48 and 50 which merge into upwardly and inwardly extending side wall portions 52 and 54 which connect two opposite ends of a top wall 56. The housing also includes a front wall 58 and a rear wall 60.

The output drive shafts 18, 32 and 34 are mounted to the rear housing wall 60 by a bearing plate 62 utilizing bolts 64.

A tool mounting bracket 66 is mounted on the housing 12 utilizing the bearing plate bolts 64. The tool bracket includes a rear wall 68, front wall 70 and opposite side walls 72 and 74 and a bottom wall 76. An opening 78 is provided in the front wall 70 in alignment with an opening 80 in the rear wall 68. A chain coupler 82 is positioned in the bracket 66 and interconnects the output drive shaft 32 to a tool input drive shaft 84 shown in dash lines in FIG. 1. The tool 88, as shown in dash lines in FIG. 2, would be mounted on the rear plate 68 of the bracket 66. Only two tool brackets 66 are shown in FIG. 1 although three obviously can be used with the third being mounted on the bearing plate 62 for output drive shaft portion 18.

Figure 2:
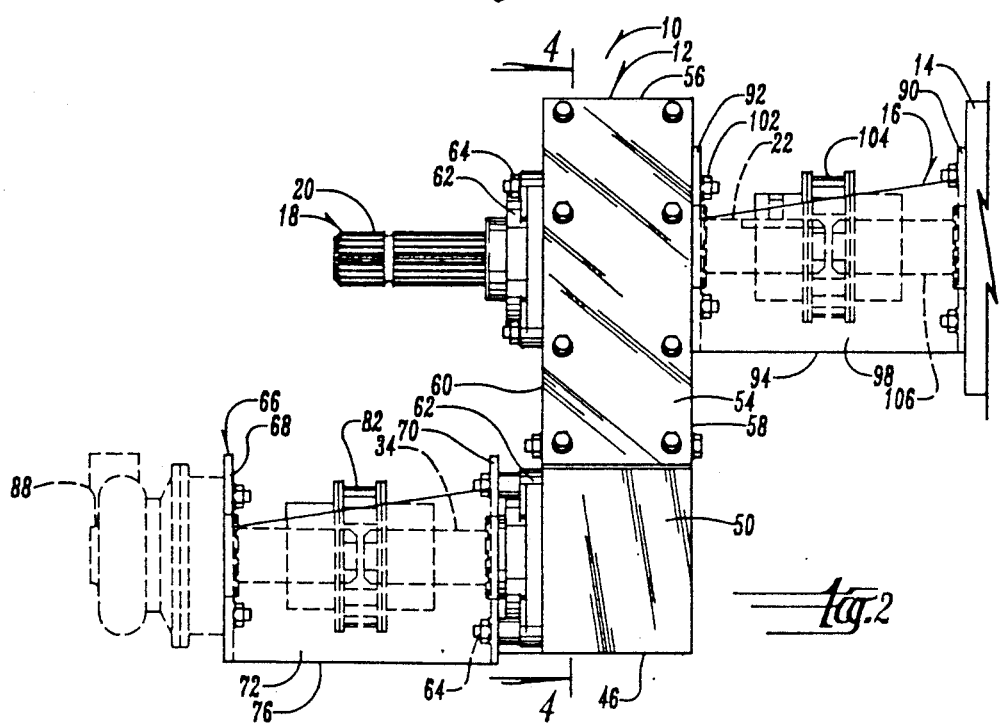
FIG. 2 is a side elevational view thereof.

The mounting bracket 16 for mounting the housing 12 to the tractor 14 is thus shown in FIGS. 1 and 2 and includes a front wall 90, rear wall 92 and opposite side walls 94 and 96 with a bottom wall 98. The bracket 16 is mounted on the housing front wall 58 by bolts 102 being connected to the rear bracket wall 92. A chain coupler 104 interconnects the input shaft 22 to a tractor PTO shaft 106.

An optional mounting bracket 108 including a bolt 110 at the bottom rear of the housing 12 may be utilized for supplemental or independent support on a draw bar (not shown) on a tractor.

A fill opening for the reservoir 36 is accessible by removal of a threaded plug 112 and a drain opening is closed by a plug 114 as seen in FIGS. 1 and 3.

An alternate arrangement is shown in FIGS. 5 and 6 and referred to generally by the reference numeral 116. The multiple drive power take off 116 includes a housing 118 in which a sprocket 24A is mounted on shaft 18A and is connected by a sprocket chain 26A to a sprocket 30A on an output shaft 34A. An oil reservoir 36A is provided in the bottom of the housing. A tool mounting bracket 66A is utilized. This embodiment is similar to the three output drive shaft embodiment of FIGS. 1- 4 except that two output drive shafts are provided. The housing 118 includes a bottom wall 120, a vertical side wall 122 which merges into an upwardly and inwardly extending wall 124 terminating at one end of a top wall 126. The top wall at its opposite end is connected to a downwardly extending wall 128 in turn connected to a downwardly and inwardly extending side wall 130 connected to the bottom wall 120. A rear wall 132 and a front wall 134 are provided.

It is thus seen that a tractor with a single output PTO shaft 106 is converted into a two or three output drive shaft through utilization of the multiple drive power take off of this invention. The housing for the multiple drive power take off is firmly mounted to the tractor through the bracket 16 and the tools which are being driven are firmly mounted to the housing by similar brackets 66. The chain couplings 82 assure a positive drive without stress on the system due to minor misalignment. The speed of individual output drive shafts may be varied as desired by varying the size of the sprockets. As shown all output drive shafts would operate at the same speed as the sprockets are all the same size.

I claim:

1. A multiple drive power take off gear assembly comprising,
   a housing having front, rear, opposite side, top and bottom side walls defining an interior gear chamber,
   a first sprocket gear in said chamber mounted on a drive shaft having an input drive shaft portion extending forwardly through said front wall and adapted to be connected to the PTO of a tractor, and an output drive shaft portion extending rearwardly through said rear wall and adapted to be connected to a tool,
   a second sprocket gear in said chamber spaced laterally from said first gear, said second gear being mounted on a second drive shaft having an output drive shaft portion extending through said rear wall and adapted to be connected to a tool,
   a third sprocket gear in said chamber spaced laterally from said first and second gears and mounted on a third drive shaft having an output drive shaft portion extending through said rear wall and adapted to be connected to a tool, and
   a drive sprocket chain interconnecting said first, second and third sprocket gears.

2. The structure of claim 1 wherein said chamber contains a reservoir of oil and said drive sprocket chair is disposed in said oil for lubricating said first and second sprockets and said chain.

3. The structure of claim 1 wherein said first, second and third sprockets and drive shafts are arranged such that said chain interconnecting them forms a triangle.

4. The structure of claim 3 wherein said second and third sprockets are positioned in a common horizontal plane below said first sprocket.

5. The structure of claim 4 wherein said second and third sprockets are positioned in a reservoir of oil provided in said chamber.

6. The structure of claim 4 wherein said housing is further defined by said opposite side walls including vertical wall portions extending upwardly from said bottom wall, said vertical wall portions merge into upwardly and inwardly extending side wall portions which connect to opposite ends of said top wall.

7. A multiple drive power take off gear assembly comprising,
   a housing having front, rear, opposite side, top and bottom side walls defining an interior gear chamber,
   a first sprocket gear in said chamber mounted on a drive shaft having an input drive shaft portion extending forwardly through said front wall and adapted to be connected to the PTO of a tractor, and an output drive shaft portion extending rearwardly through said rear wall and adapted to be connected to a tool,
   a second sprocket gear in said chamber spaced laterally from said first gear, said second gear being mounted on a second drive shaft having an output drive shaft portion extending through said rear wall and adapted to be connected to a tool,
   a drive sprocket chain interconnecting said first and second sprocket gears, and
   a support bracket mounted on the front wall of said housing adapted to be connected to a tractor for supporting said housing on a tractor.

8. The structure of claim 7 wherein said support bracket is defined as having front and rear walls with said rear wall bolted to said housing front wall and said bracket front wall being adapted to be bolted to a tractor.

9. The structure of claim 8 wherein said input drive shaft portion extends between said bracket front and rear walls and includes a chain coupling adapted to be connected to a tractor PTO extending between said bracket front and rear walls.

10. The structure of claim 9 wherein said bracket front and rear walls are interconnected by oppositely disposed side walls disposed on opposite sides of said input drive shaft portion.

11. The structure of claim 10 wherein said front and rear bracket walls include alignment openings with said input drive shaft extending through said opening in said rear bracket wall and said PTO shaft adapted to extend through said front bracket wall opening.

12. A multiple drive power take off gear assembly comprising,
    a housing having front, rear, opposite side, top and bottom side walls defining an interior gear chamber,
    a first sprocket gear in said chamber mounted on a drive shaft having an input drive shaft portion extending forwardly through said front wall and adapted to be connected to the PTO of a tractor, and an output drive shaft portion extending rearwardly through said rear wall and adapted to be connected to a tool,
    a second sprocket gear in said chamber spaced laterally from said first gear, said second gear being mounted on a second drive shaft having an output drive shaft portion extending through said rear wall and adapted to be connected to a tool,
    a drive sprocket chain interconnecting said first and second sprocket gears, and
    a support bracket mounted on the rear wall of said housing adapted to support a tool to be driven by said output drive shaft portion.

13. The structure of claim 12 wherein said support bracket is defined as having front and rear walls with said front wall being bolted to said rear wall of said housing and said bracket rear wall being adapted to be bolted to a tool.

14. The structure of claim 13 wherein said output drive shaft portion extends between said bracket front and rear walls and includes a chain coupling adapted to be connected to a tool drive shaft extending between said bracket front and rear walls.

15. The structure of claim 14 wherein said bracket front and rear walls are interconnected by oppositely disposed sidewalls disposed on opposite sides of said output drive shaft portion.

16. The structure of claim 15 wherein said front and rear bracket walls include aligned openings with said output drive shaft extending through said opening in said front bracket wall and, a tool shaft adapted to extend through said rear bracket wall opening.

* * * * *